(12) United States Patent
Hanisch et al.

(10) Patent No.: US 11,828,622 B2
(45) Date of Patent: Nov. 28, 2023

(54) SENSOR ELEMENT AND DEVICE FOR MEASURING PROCESS PARAMETERS IN A SINTERING PLANT

(71) Applicant: Siemens Aktiengesellschaft, Munich (DE)

(72) Inventors: Michael Hanisch, Hohen Neuendorf (DE); Nora Jeske, Berlin (DE); Jonas Massierer, Schulzendorf (DE); Marco Matiwe, Berlin (DE); Dennis Sommerfeld, Berlin (DE); Ulrich Wittreich, Brandenburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 89 days.

(21) Appl. No.: 17/638,847

(22) PCT Filed: Jun. 26, 2020

(86) PCT No.: PCT/EP2020/067978
§ 371 (c)(1),
(2) Date: Feb. 27, 2022

(87) PCT Pub. No.: WO2021/037419
PCT Pub. Date: Mar. 4, 2021

(65) Prior Publication Data
US 2022/0333961 A1 Oct. 20, 2022

(30) Foreign Application Priority Data
Aug. 29, 2019 (EP) ..................................... 19194365

(51) Int. Cl.
*G01D 21/02* (2006.01)

(52) U.S. Cl.
CPC ................................... *G01D 21/02* (2013.01)

(58) Field of Classification Search
CPC .............................. G01D 21/02; G01D 21/00
See application file for complete search history.

(56) References Cited

U.S. PATENT DOCUMENTS

| 4,748,138 A * | 5/1988 | Watanabe | ............. C04B 35/119 501/89 |
| 2007/0119226 A1 | 5/2007 | Tellenbach | ...................... 73/1.15 |
| 2008/0204265 A1* | 8/2008 | Waser | .................... G01D 3/021 340/679 |

FOREIGN PATENT DOCUMENTS

| CN | 106 908 473 | | 6/2017 | ............. G06F 11/14 |
| CN | 107941283 A | * | 4/2018 | ............. G01D 21/02 |
| CN | 109141517 A | * | 1/2019 | ............. G01D 21/02 |
| CN | 110035840 B | * | 5/2021 | ............. B21C 51/00 |
| CN | 114964349 A | * | 8/2022 | |

(Continued)

OTHER PUBLICATIONS

Search Report for International Application No. PCT/EP2020/0267978, 10 pages, dated Oct. 7, 2020.

*Primary Examiner* — Francis C Gray
(74) *Attorney, Agent, or Firm* — Slayden Grubert Beard PLLC

(57) ABSTRACT

Various embodiments of the teachings herein include a sensor element for recording process parameters at a measurement point in a sintering press/sintering plant. The sensor element comprises: a first temperature sensor; and a force sensor. A force and a temperature are recorded at the measurement point at which the sensor element is arranged.

14 Claims, 2 Drawing Sheets

(56) References Cited

FOREIGN PATENT DOCUMENTS

| CN | 115046593 A | * | 9/2022 | |
|---|---|---|---|---|
| JP | 2 914636 | | 7/1999 | .............. F27B 17/00 |
| JP | 5 941686 | | 6/2016 | ................ B22F 3/14 |

* cited by examiner

SENSOR ELEMENT AND DEVICE FOR MEASURING PROCESS PARAMETERS IN A SINTERING PLANT

CROSS-REFERENCE TO RELATED APPLICATIONS

This application is a U.S. National Stage Application of International Application No. PCT/EP2020/067978 filed Jun. 26, 2020, which designates the United States of America, and claims priority to EP Application No. 19194365.3 filed Aug. 29, 2019, the contents of which are hereby incorporated by reference in their entirety.

TECHNICAL FIELD

The present disclosure relates to sintering plants. Various embodiments of the teachings herein include sensor elements for recording process parameters at a measurement point in a sintering plant, and/or devices for combining a plurality of sensor elements for recording process parameters at a plurality of measurement points.

SUMMARY

The teachings of the present disclosure may be used to record combinations of a plurality of process parameters of a sintering process, in particular a joining sintering process, in a simple and simultaneous manner. For example, some embodiments include a sensor element (11, . . . , 15) for recording process parameters at a measurement point (M1, . . . , M5) in a sintering press/sintering plant, having at least a first temperature sensor (T1) and a force sensor (F1) which are arranged such that force and temperature are recorded at that measurement point (M1, . . . , M5) at which the sensor element is arranged.

In some embodiments, there is a second temperature sensor (T2) which is arranged on an opposite side (11H, 11L) of the sensor element (11, . . . , 15) with respect to the first temperature sensor (T1).

In some embodiments, there is a distance compensation element (XT2) which is designed such that height differences between at least one of the temperature sensors (T1, T2) and a surface to be measured are compensated for.

In some embodiments, the force sensor (F1) is arranged between the first temperature sensor (T1) and a second temperature sensor (T2).

In some embodiments, there is a travel sensor (Z1) which is designed such that it is possible to detect when a surface to be measured approaches the sensor element (11, . . . , 15).

In some embodiments, there is an oxygen sensor.

In some embodiments, there is a signal interface (C11).

As another example, some embodiments include a device (100) for recording process parameters at measurement points (M1, . . . , M5) in a sintering plant, having a plurality of sensor elements (11, . . . , 15) as claimed in one of the preceding claims and a recording module (150) which is designed to record the process parameters at the measurement points (M1, . . . , M5) at which the sensor elements (11, . . . , 15) are arranged.

In some embodiments, the recording module (150) is designed to evaluate signals from the sensor elements.

In some embodiments, at least some of the sensor elements (11, . . . , 15) differ from one another.

In some embodiments, there is a base unit (120) which is used to accommodate, in particular fasten, the sensor elements (11, . . . , 15).

In some embodiments, there is a base unit (120) which is used to make electrical contact with the sensor elements (11, . . . , 15).

In some embodiments, there is an energy supply device (EV).

In some embodiments, there is a communication interface (COM100).

BRIEF DESCRIPTION OF THE DRAWINGS

Various embodiments of the teachings herein are described and explained in more detail below on the basis of the exemplary embodiments illustrated in the figures, in which.

DETAILED DESCRIPTION

Figure 1:
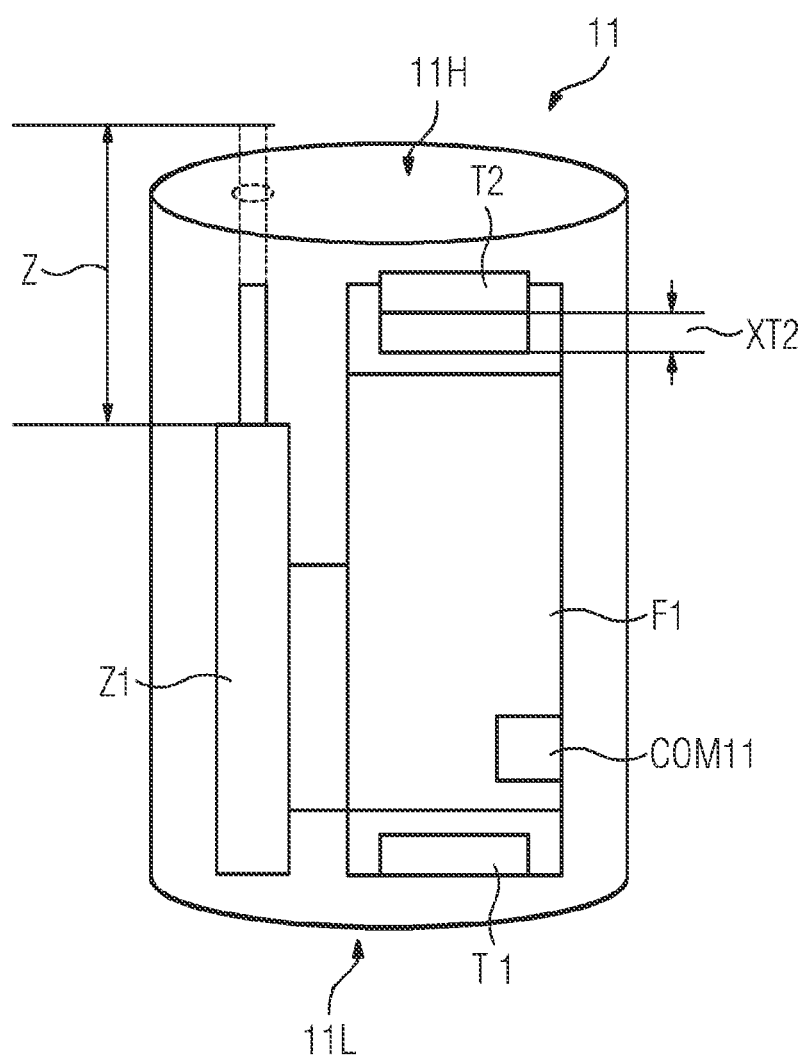
FIG. 1 shows an embodiment of a sensor element incorporating teachings of the present disclosure.

The teachings of the present disclosure can be used in plants which are used when producing sintered connections for connecting (unpackaged) semiconductor chips, also referred to as "(bare) dies". In principle, the teachings can be used in common joining processes with sintering presses, for example the joining of a heat sink to a substrate. Silver sintering, which is being used more and more frequently as an alternative connection technology to conventional soldering processes in power electronics, can be mentioned here as an example. For this purpose, a sintering plant has a tool, for example a stamp, which is designed to exert pressure and impress temperature and thereby produces a sintered connection between two joining partners. It has hitherto only been possible in a complicated manner to separately record individual process parameters, for example temperature or force or environmental conditions, and to then analyze them. A correlation between the measured values and the measurement points and between different variables is possible only with difficulty if the spatial relationship, for example between temperature and force, is defined only inaccurately or must be recorded in a complicated manner by means of a plurality of measurement series.

Some embodiments of the teachings herein may include a sensor element which is designed to record process parameters at a measurement point in a sintering plant. For this purpose, the sensor element has at least a first temperature sensor and a force sensor, wherein the two sensors are arranged such that force and temperature can be recorded at that measurement point at which the sensor element is arranged. As a result of the local proximity of the two sensors, it is possible to record the process parameters with a direct correlation with one another and in a meaningful manner for subsequent evaluations and without the need for model assumptions. It is also possible to provide a particularly compact sensor element.

In some embodiments, the sensor element has a second temperature sensor. In this case, the second temperature sensor is arranged on an opposite side of the sensor element with respect to the first temperature sensor. In some embodiments, one of the two temperature sensors is arranged on the top side of the sensor element and the other is arranged on the underside of the sensor element, wherein the top side of the sensor element is the side facing the sintering stamp and the underside is the side which is arranged on the bottom side of the sintering plant either directly or via a base unit. The temperatures of a heating plate which is possibly on the bottom side and the temperature of the sintering stamp can therefore be directly recorded and evaluated. In other words, it is possible to record the temperature on the top side and the underside of the sensor element.

In some embodiments, the sensor element has a distance compensation element which is designed such that height differences between at least one of the temperature sensors and a surface to be measured are compensated for. In this case, the surface to be measured may be, for example, the stamp of the sintering plant or of the sintering press in the closed state. If the stamp or the contact surface is not properly oriented, this may result in height differences. If, for example, one sensor element has full contact and a further sensor element would not have any contact without the distance compensation element, the distance compensation element can therefore to be used to establish contact. In this case, the distance compensation element may be in the form of a resilient element or an elastic buffer element, for example, which can be deformed under pressure. The temperature can be measured in a particularly uniform manner even if no ideal orientation of the components involved can be ensured. Height differences of up to several 100 µm can preferably be compensated for here.

In some embodiments, the force sensor is arranged between the first temperature sensor and a second temperature sensor. The force sensor does not come into contact directly with the hot surfaces, since the temperature sensors are initially arranged there, and that the force which acts directly on the two temperature measurement points can also be recorded. This makes it possible to capture the relationships between temperature and the effect of force in a particularly accurate manner.

In some embodiments, the sensor element has a travel sensor which is designed such that it is possible to detect when a surface to be measured approaches the sensor element. In particular, it is of interest if the sintering stamp of a sintering plant approaches the sensor element and the travel profile can therefore be correlated with the force profile and the temperature profile. In this case, the travel sensor may be advantageously in the form of a capacitive travel sensor which is highly suitable on account of its high robustness and resolution. Furthermore, if the stamp is already in contact with the sensor element, the compression of the sensor element can be recorded, if this is provided for.

In some embodiments, the sensor element has an oxygen sensor. The latter is used to record the atmospheric conditions and can indicate fluctuations in the atmosphere caused by air flow during the sintering process, for example.

In some embodiments, the sensor element has a signal interface. In order to influence the signal quality of analog signals as little as possible, solutions which are hard-wired on the element side are conceivable. Releasable connections are conceivable on the side of the recording module. In this case, the signal interface is used, in particular, to communicate with a recording module, but may also be designed to directly communicate with an evaluation computer. In this case, the recording module is designed to record the measurement data from the sensor elements and may be connected in this case to the sensor element for digital or analog communication.

In some embodiments, there is a device which is designed to record process parameters at measurement points in a sintering plant. For this purpose, the device has a plurality of sensor elements which can be arranged at a plurality of measurement points. The device also has a recording module which is designed to record the process parameters at the measurement points at which the sensor elements are arranged. The combination of a plurality of sensor elements makes it possible to determine distributions of temperature and force and possibly further variables over an area. This enables more accurate calibration, higher-quality operation and elimination of faults during operation of sintering plants.

In some embodiments, the recording module is designed to evaluate signals from the sensor elements. In this case, the recording module may be designed, for example, to evaluate analog measurement signals from the sensor elements. It is possible to provide evaluation electronics for a capacitive travel sensor and/or a force sensor for this purpose. The analog measurement signals can then be provided as digital measured values by means of an A/D converter.

In some embodiments, at least some of the sensor elements differ from one another. That is to say, various sensor elements can be used, wherein only sensor elements with a temperature sensor and a force sensor are fitted at less critical locations, for example, and others in turn have the complete selection of force sensors, temperature sensors, travel sensors and possibly further sensors. In some embodiments, simple sensor elements, which have only a temperature sensor and no force sensor, may be used at mechanically uncritical but thermally critical locations. In some embodiments, sensor elements can be combined with one another in a flexible manner irrespective of form using the device.

In some embodiments, the device has a base unit which is used to accommodate the sensor elements. In some embodiments, the base unit is designed not only to accommodate but also to fasten the sensor elements. A plug-in system is possible here, in which the sensor elements can be arranged and fastened by being plugged in.

In some embodiments, the device has a base unit which is used to make electrical contact with the sensor elements. It is conceivable for electrical contacts which replace cabling of the sensor elements to be provided in the base unit. It is particularly advantageous if the electrical contact is provided in the receptacles, as described above.

In some embodiments, the device has an energy supply device. This may be provided in the form of a rechargeable battery. In some embodiments, inductive or other energy supplies which do not influence the measurement process are also conceivable. A rechargeable battery solution allows the device to act in a particularly autonomous manner. In this case, the energy supply device may also have such small dimensions that the energy supply suffices to provide the energy for one measurement cycle (that is to say one cycle of the sintering plant). Particularly robust capacitor solutions, for example, can be used here. In other words, the energy supply device may be designed to supply the sensor elements for at least one run.

In some embodiments, the device may also have an acceleration sensor designed to record the acceleration of the device and therefore also of the sensor elements when running through a sintering process. High accelerations and/or vibrations which act on the device and could damage the assembly to be processed can therefore be determined. In some embodiments, it is also possible to determine low accelerations which can still be optimized in order to enable a temporally optimum run through the production process.

In some embodiments, the device has a communication interface. The latter may be wired, for example a USB interface, but a wireless interface which makes the data from the device available to the outside directly from the process is also possible. The measurement data obtained can already be directly and immediately evaluated during the process run and optimizations of the plant could therefore also be performed during the process run.

FIG. 1 is a schematic drawings showing a sensor element 11 in an extended expansion stage. The sensor element 11 has a top side 11H and an underside 11L and is cylindrical in this case. A first temperature sensor T1 is provided for the purpose of recording the temperature on the underside 11L. A second temperature sensor T2, which in this case has a distance compensation element XT2 which can compensate for relatively short distances with respect to the top side, is also provided for the purpose of recording the temperature on the top side 11H. The sensor element 11 also has a travel sensor Z1 which is designed to record a distance Z which can go beyond the dimensions of the sensor element 11. For this purpose, the travel sensor Z1 has a rod-shaped measurement head which can record the distance between a surface to be measured and the sensor element. In some embodiments, the travel sensor may also be capacitive. The distance Z to be measured is generally the distance between the sintering stamp of the sintering press and the sensor element 11 or the top side 11H of the sensor element 11. The sensor element 11 also has a force sensor F1 which is arranged between the two temperature sensors T1, T2. The sensor element 11 also has a signal interface COM11 which may be designed to output measurement signals to a recording module. The signal interface COM11 may be wired in this case and may be designed for analog communication with an evaluation device.

Figure 2:
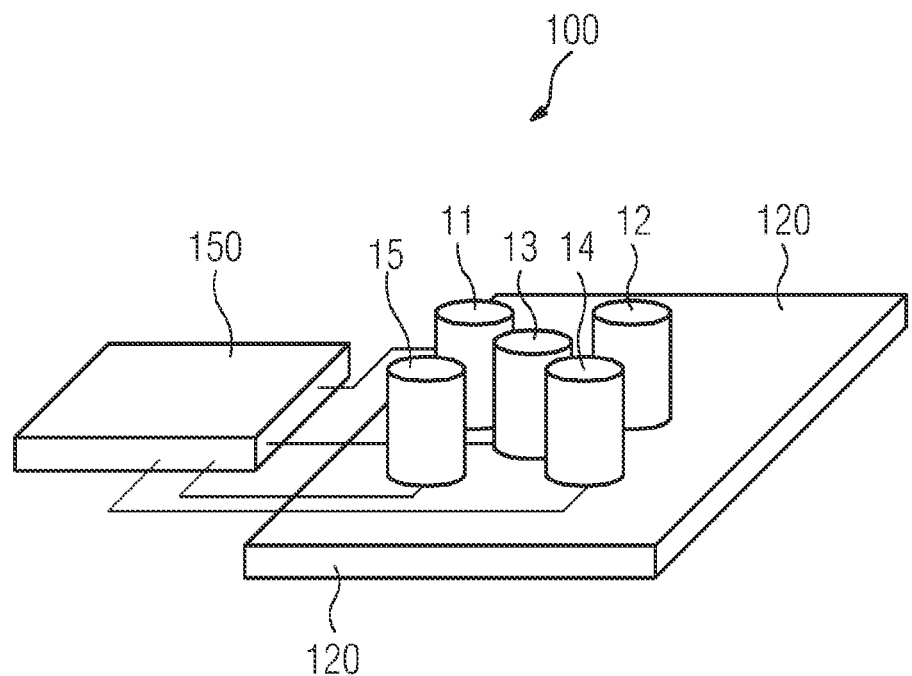
FIG. 2 shows a device incorporating teachings of the present disclosure.

FIG. 2 shows a device 100, a recording module 150 and five sensor elements 11, . . . , 15. In this case, the sensor elements 11, . . . , 15 are arranged on a base unit 120. The base unit 120 may be configured such that the sensor elements 11, . . . , 15 can be plugged in and can project from the base unit 120 both at the top and at the bottom, thus enabling direct contact between the sensor elements 11, . . . , 15 and the process chamber of the sintering plant. In this case, the sensor elements 11, . . . , 15 can be freely arranged and can be adapted to the dimensions of the sintering plant. Individual sensor elements 11, . . . , 15 can be added or omitted. It is possible to use only a single sensor element 11, . . . , 15 with the device. The base unit 120 and the recording module 150 have a two-part configuration here, but may also have a single-part configuration. It is possible for the base unit 120 to already have a certain number of permanently installed sensor elements 11, . . . , 15 which can also be supplemented with further sensor elements 11, . . . , 15. The sensor elements 11, . . . , 15 are connected to the recording module 150 by way of measurement lines.

Figure 3:
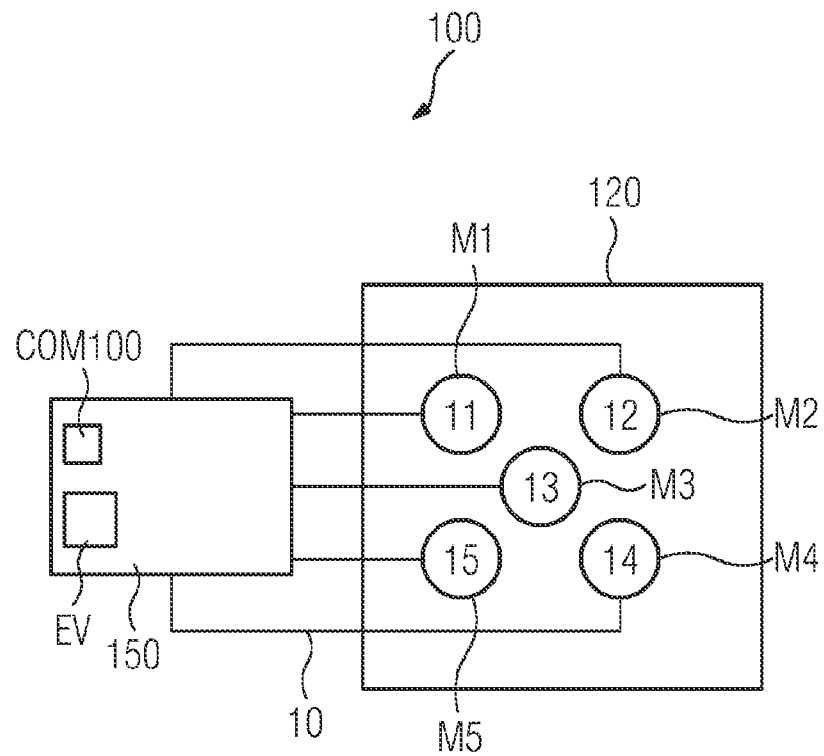
FIG. 3 shows a plan view of the device shown in FIG. 2.

FIG. 3 shows a plan view of the device 100 from FIG. 2. It can be seen in this case that the recording module 150 has an acceleration sensor A1, a communication module COM100 and an energy supply device EV. The arrangement of the communication module COM100 and the energy supply device EV in the recording module 150 has proved to be expedient since a high integration density is enabled in this manner. Alternative arrangements are likewise possible in this case.

As shown, the sensor elements 11, . . . , 15 are directly connected to the recording module 150 via data lines 10. In this case, these data lines 10 may be embedded in the base unit 120 or may be flexibly in the form of external lines. The distribution of the sensor elements 11, . . . , 15 is as follows in this case: the sensor element 11 is arranged at the measurement point M1, the sensor element 12 is arranged at the measurement point M2, . . . and the sensor element 15 is arranged at the measurement point M5. In this case, the arrangement of the sensor elements at the measurement points M1, . . . , M5 is freely selectable and can be supported by a base unit 120. However, the arrangement of the measurement points depends on which sintering system is intended to be measured. Furthermore, the arrangement of the measurement points depends on the product layout, the parameters of which are intended to be measured. In some embodiments, the measurement points are arranged, in particular, where it is necessary to accurately evaluate the process parameters. This is the case, in particular, at those locations at which the semiconductors are expected in the sintering press.

In summary, the teachings include sensor elements (11, . . . , 15) for recording process parameters at a measurement point (M1, . . . , M5) in a sintering plant as well as devices (100) for combining a plurality of sensor elements (11, . . . , 15) for recording process parameters at a plurality of measurement points (M1, . . . , M5). In order to be able to record combinations of a plurality of process parameters of a sintering process, in particular a joining sintering process, in a simple and simultaneous manner, a sensor element (11, . . . , 15) for recording process parameters at a measurement point (M1, . . . , M5) in a sintering press/sintering plant is proposed. For this purpose, the sensor element (11, . . . , 15) has a first temperature sensor (T1) and a force sensor (F1) which are arranged such that force and temperature are recorded at that measurement point (M1, . . . , M5) at which the sensor element is arranged. Some embodiments include a device (100) for recording process parameters at measurement points (M1, . . . , M5) in a sintering plant, having a plurality of sensor elements (11, . . . , 15) according to the invention and a recording module (150) which is designed to record the process parameters at the measurement points (M1, . . . , M5) at which the sensor elements (11, . . . , 15) are arranged.

What is claimed is:

1. A sensor element for recording process parameters at a measurement point in a sintering press/sintering plant, the sensor element comprising:
   a first temperature sensor; and
   a force sensor;
   wherein a force and a temperature are recorded at the measurement point at which the sensor element is arranged.

2. The sensor element as claimed in claim 1, a second temperature sensor arranged on an opposite side of the sensor element from the first temperature sensor.

3. The sensor element as claimed in claim 1, further comprising a distance compensation element compensating for height differences between at least one of the temperature sensors and a surface to be measured.

4. The sensor element as claimed in claim 1, wherein the force sensor is arranged between the first temperature sensor and a second temperature sensor.

5. The sensor element as claimed in claim 1, further comprising a travel sensor detecting when a surface to be measured approaches the sensor element.

6. The sensor element as claimed in claim 1, further comprising an oxygen sensor.

7. The sensor element as claimed in claim 1, further comprising a signal interface.

8. A device for recording process parameters at measurement points in a sintering plant, the device comprising:
   a plurality of sensor elements; and
   a recording module record the process parameters at the measurement points at which the sensor elements are arranged;

wherein each sensor element comprises:
a first temperature sensor; and
a force sensor;
wherein a force and a temperature are recorded at the measurement point at which the sensor element is arranged.

9. The device as claimed in claim 8, wherein the recording module evaluates signals from each of the sensor elements.

10. The device as claimed in claim 8, wherein at least some of the plurality of sensor elements differ from one another.

11. The device as claimed in claim 8, further comprising a base unit accommodating the sensor elements.

12. The device as claimed in claim 8, further comprising a base unit making electrical contact with the sensor elements.

13. The device as claimed in claim 8, further comprising an energy supply device.

14. The device as claimed in claim 8, further comprising a communication interface.

* * * * *